United States Patent [19]
Land et al.

[11] Patent Number: 5,024,808
[45] Date of Patent: Jun. 18, 1991

[54] COMBINED SUPPORT COLUMN AND GUIDE TUBE FOR USE IN A NUCLEAR REACTOR

[75] Inventors: John T. Land; Ronald J. Hopkins, both of Pensacola, Fla.

[73] Assignee: Westinghouse Electric Corp., Pittsburgh, Pa.

[21] Appl. No.: 553,407

[22] Filed: Jul. 17, 1990

Related U.S. Application Data

[63] Continuation-in-part of Ser. No. 483,302, Feb. 21, 1990, abandoned, which is a continuation of Ser. No. 257,672, Oct. 14, 1988, abandoned.

[51] Int. Cl.⁵ .................................................. G21C 7/08
[52] U.S. Cl. ..................................................... 376/353
[58] Field of Search ................. 376/353, 449, 352, 260

[56] References Cited

U.S. PATENT DOCUMENTS

| | | | |
|---|---|---|---|
| 3,836,429 | 9/1974 | Frisch et al. | 376/353 |
| 3,849,257 | 11/1974 | Bevilacqua | 376/353 |
| 3,940,311 | 2/1976 | Frisch et al. | 376/353 |
| 4,092,216 | 5/1978 | Aubert | 376/353 |
| 4,173,513 | 11/1979 | Obermeyer et al. | 376/353 |
| 4,606,881 | 8/1986 | Millot et al. | 376/353 |

*Primary Examiner*—Daniel D. Wasil

[57] ABSTRACT

A combined support and guide tube member for use in a nuclear reactor is disclosed which both suspends an upper core plate from an upper support plate and receives and guides a control rod assembly through mutually aligned apertures in the support and core plates. The tube member generally comprises an elongated tubular body having an upper and lower mounting assembly for detachably mounting the upper and lower ends of the body around selected, aligned apertures in the support plate and core plate, respectively. The upper mounting assembly includes four mounting lugs disposed 90 degrees around the upper edge of the tubular body, as well as mounting bolts for detachably connecting the mounting lugs around an aperture in the support plate. The support plate aperture includes four cloverleaf cutouts which are complementary in shape to the four mounting lugs of the upper mounting assembly so that the entire support and guide tube member may be easily removed from the nuclear reactor by merely aligning the lugs with the cloverleaf cutouts, and withdrawing the tube member through the selected aperture. The tubular body of the tube member includes an array of flow ports for uniformly discharging pressurized water flowing out of the upper core plate in such a manner so as to avoid localized water jets which can vibrate and fret the rodlets forming the control rod assemblies. Finally, the combined support and guide tube member is formed from the same type of stainless steel forming the support and core plates to minimize stresses caused by differential thermal expansion.

14 Claims, 6 Drawing Sheets

COMBINED SUPPORT COLUMN AND GUIDE TUBE FOR USE IN A NUCLEAR REACTOR

This is a continuation-in-part of U.S. patent application Ser. No. 07/483,302 filed Feb. 21, 1990, which in turn is a file-wrapper-continuation of U.S. patent application Ser. No. 07/257,672 filed Oct. 14, 1988, both abandoned.

BACKGROUND OF THE INVENTION

This invention generally relates to improvements in the upper internals assembly of a nuclear reactor, and is specifically concerned with a combined support column and guide tube which serves both to support the upper core plate of the reactor, over its fuel rod assemblies, as well as to receive and guide control rod assemblies into the fuel rod assemblies.

The core of a modern nuclear reactor of the type used to generate electrical power generally includes an upper internals assembly disposed over a lower core barrel. The lower core barrel houses an array of fuel rod assemblies which generate heat as a result of a controlled fission reaction that occurs in the uranium oxide pellets present in their individual fuel rods. Water is constantly circulated from the lower core barrel through the upper internals and out through outlet nozzles provided in the walls of an upper core barrel in order to transfer the heat generated by the fuel rod assemblies to heat exchangers which ultimately convert this heat into usable, nonradioactive steam.

The rate of the fission reaction taking place within the fuel rod assemblies is regulated by means of a control rod assembly. Each of these control rod assemblies is formed from an array of stainless steel tubes containing a neutron absorbing substance, such as silver, indium or cadmium. These stainless steel tubes (known as "rodlets" in the art) are suspended from a spider-like bracket. A reciprocable drive rod is connected to the spider like bracket for either inserting or withdrawing the rodlets of the control rod assembly deeper into or farther out of each of the fuel rod assemblies in order to modulate the amount of heat generated thereby.

The upper internals assembly includes an upper core barrel arranged in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for both conducting the stream of hot, pressurized water exiting the fuel rod assemblies to the heat exchangers, as well as for conducting a control rod assembly either into or out of each of the fuel rod assemblies. Separate guide tubes are provided between apertures in both the support and ore barrel plates which are aligned with each other and with one of the fuel assemblies in the lower core barrel. The purpose of these guide tubes was to align and guide the relatively long and flexible rodlets of the control rod assemblies into a particular fuel assembly. Additionally, separate support columns are connected between the upper support plate and the underlying upper core plate in order to suspend and support the upper core plate over the fuel rod assemblies contained within the lower core barrel.

To facilitate the servicing of the components within the upper core barrel of such prior art nuclear reactors, the guide tubes had to be removable. Accordingly, each of the guide tubes included a pair of opposing, apertured lugs at its bottom end for receiving the top ends of a pair of opposing guide pins which were mounted on either side of one of the control rod-receiving apertures in the upper core plate. A mounting flange was provided at the upper end of each of the guide tubes. This flange sat upon the upper surface of the support plate when the guide tube was completely slid through a support plate aperture, thereby suspending the guide tube over its respective aperture in the upper core plate so that the guide pins in the upper core late provided only lateral support for the guide tube. To minimize corrosion problems, the guide pins in such designs were formed from Inconel 750, while the support plate, upper core plate and other components of the guide tubes were formed from No. 304 stainless steel.

The Applicants have observed that a number of problems have resulted from such prior art upper internals designs. For example, the differences in the coefficient of thermal expansion between the Inconel which forms the guide tubes and the stainless steel which forms the support plate and the upper core plate have generated stresses in the guide pins that have occasionally caused these pins to break due to stress corrosion cracking. Such pin breakage has had the immediate negative consequence of introducing large pieces of metallic debris into the pressurized stream of water flowing up through the upper core plate. Such debris can, of course, damage the primary system circulation pumps. Additionally, after the loss of one or more of the guide pins, the currents generated by this rapidly flowing stream of water (which typically moves at a rate of 20 feet per second) can cause the guide tube to wobble out of alignment with its respective aperture and possibly strike and damage adjacent guide tubes. Still another problem associated with such prior art guide tubes stems from the fact that they are not designed to bear any significant tensile load. Hence, separate support columns must be provided for suspending the upper core plate over the fuel rod assemblies. The use of two separate types of columns within the upper core barrel complicates both the assembly and disassembly of this particular region of the reactor, which in turn greatly increases the time required for routine maintenance in the upper internals of the reactor. Finally, while such prior art guide tubes typically include an array of ports in their walls for dissipating the pressure generated therein by the water flowing upwardly from the lower core barrel, the Applicants have observed that the port sizes and configurations have not been entirely successful in preventing localized jets of water from forming in the interior of these tubes. Such localized jets have been found to induce vibrations in the long and slender rodlets of the control rod assemblies, which in turn can cause them to rub and fret against the components surrounding them.

SUMMARY OF THE INVENTION

Generally speaking, the invention is a combination support and guide tube member for both suspending the upper core plate of a nuclear reactor over its fuel assemblies and for receiving and guiding a control rod assembly through mutually aligned apertures in the support and upper core plates. The support and guide tube member comprises an elongated tubular body having an upper and a lower mounting assembly for mounting the upper and lower ends of the tube member around selected, aligned apertures in the support plate and upper core plate, respectively. In the preferred embodiment, both the upper and lower mounting assemblies include at least one pair of opposing mounting lugs integrally formed on the outer edges of either the upper or the lower end of the body of the tube member. Each of the mounting lugs includes a threaded bore for receiving a mounting bolt that detachably connects the ends of the tube member between a pair of mutually aligned apertures. Additionally, the aperture in the support plate is preferably provided with a series of recesses around its perimeter which are complementary in shape to the lugs of the upper mounting assembly so that when the mounting bolts are removed from both the upper and lower mounting assemblies, the entire tube member may be withdrawn through the support plate when the mounting lugs of the upper mounting assembly are rotated into alignment with the recesses.

The tubular body of the support and guide tube member may further include a plurality of ports in its walls for discharging pressurized water that flows out of the upper core plate during the operation of the primary system. The flow area of these ports is preferably about twice the cross-sectional area of the tube member in order to slow down the rate of flow of the pressurized water. These ports are preferably configured around the perimeter of the tubular body so as to uniformly discharge the flow of pressurized water received at the bottom end of the tube member from the upper core plate. If the flow of pressurized water is uniformly distributed around the inner wall of the tubular body, then the flow area of each of the ports is made substantially the same. However, if there are localized pressure differences due to the presence of interfering mechanical structures (such as control rod assemblies) within the tube member, then the flow area of the ports are different in order to compensate for these flow differences. To avoid nonuniformities in the shear strength of the tube member, each of the ports may be located at different points alone the longitudinal axis of the tubular body.

In the alternative, the mounting lugs forming the lower mounting assembly may take the form of feet which are offset from the bottom edge of the tubular member in order to create a pressure-relieving gap between the bottom edge of the tube member, and the upper edge of the core plate aperture which it circumscribes. This particular design alternative may be used either in addition to or in lieu of flow ports in the side walls of the tubular body.

In order to eliminate or at least minimize stresses between the support and guide tube members and the support and core plates resulting from differential thermal expansion, the support plate, core plate, and tube body may be made from the same metal alloy. In the preferred embodiment, each of these components is made from No. 304 stainless steel.

The combined support and guide tube member of the invention simplifies both the structure and the construction of the upper internals of the core barrel of a nuclear reactor, and provides a support member which is essentially free of stresses generated as a result of differential thermal expansion. Additionally, the flow ports provided in the walls of the tubular bodies of these members dissipates the pressure of the water flowing out of the upper core plate in such a manner as to eliminate localized water jetting which could in turn cause the rodlets forming the control rod assemblies to resonate and fret.

BRIEF DESCRIPTION OF THE SEVERAL FIGURES

FIG. 1 is a perspective, cut-away view of the type of reactor core which the combined guide tube and support column of the invention finds particular use in;

DETAILED DESCRIPTION OF THE PREFERRED EMBODIMENT

Figure 1:
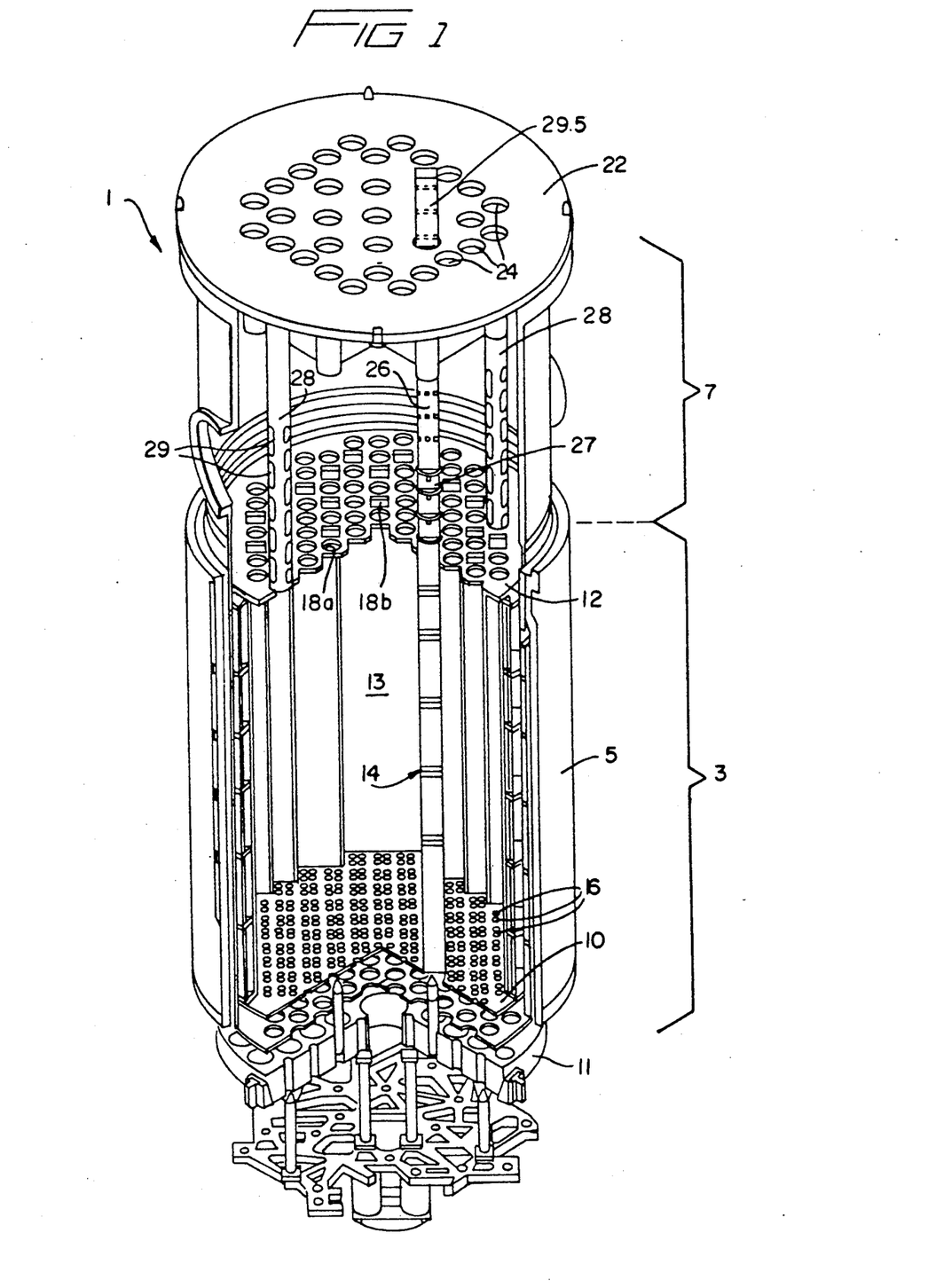

With reference now to FIG. 1, the combined guide tube and support column of the invention finds particular use in a reactor core 1 of the type having a lower core barrel 3 circumscribed by a thermal shield 5, and an upper core barrel 7. In such reactor cores 1, the lower core barrel 3 includes a floor and a ceiling, the floor being formed from a lower core plate 10 that is supported by a core support forging 11, and the ceiling being formed from an upper core plate 12. Baffle plates 13 circumscribe the interior sides of the lower core barrel 3. The general purpose of these baffle plates 13 is to divert a portion of the flow of incoming primary water (not shown) upwardly to cool the lower core barrel. The remainder of the flow moves upwardly through the upper core plate 12, and from thence to the upper core barrel 7. A plurality of fuel rod assemblies 14 (only one of which is shown) are disposed with the lower core barrel 3 between the lower core plate 10 and the upper core plate 12. In operation, the uranium fuel contained within the fuel rods forming these fuel rod assemblies 14 radiates a considerable amount of heat which is absorbed by the water flowing upwardly through the lower core plate 11 and transferred to a steam generator (not shown) that converts this heat into nonradioactive steam.

To uniformly distribute the water flowing upwardly through the core support forging 11 and on into the upper core barrel 7, both the lower core plate 10 and the upper core plate 12 have a uniform array of flow apertures 16 and 18a, 18b, respectively, which are in mutual alignment with one another. The bottom and top ends of each of the fuel rod assemblies 14 are positioned over and under one of the flow apertures 18b and 16, respectively, to heat the flow of water through these apertures.

The core barrel 7 has a floor and a ceiling defined by the upper core plate 12 and an upper support plate 22, respectively. Like the core plates 10 and 12, the upper support plate 22 includes flow apertures 24. Each of the these flow apertures 24 is disposed in alignment with one of the flow apertures 18b of the upper core plate 12. Disposed between each pair of mutually aligned apertures 22 and 18b is a tubular control rod guide tube 26. The purpose of this guide tube 26 is to align and guide a control rod assembly 27 into and out of one of the fuel assemblies 14. The neutron-absorbing materials forming the rodlets of the control rod assembly 27 are capable of slowing down the chain reaction of fission taking place within the uranium fuel of the fuel assemblies 14. Hence the output of the heat generated by the fuel rod assemblies 14 is dependent upon the extent to which the control rod assemblies 27 are extended therein.

As will be better understood hereinafter, the upper core plate 12 is not suspended over the fuel rod assembly 14 by means of the control rod guide tubes 26; this function is instead performed by support columns 28 (only one of which is shown). Like the previously described guide tube 26, each of the support columns 28 is generally tubular in shape albeit with thicker walls. The lower, open end of each of these tubular support columns 28 is aligned with one of the flow apertures 18a of the upper core plate 12, while the upper open end of each of these members 28 is secured against a closed portion of the upper support plate 22. To facilitate the flow of water from the flow apertures 18a, 18b of the upper core plate 12 up to the upper core barrel 7, a plurality of flow slots 29 is cut in the walls of the column 28 as shown. The upper core plate 12, the support plate 22, the control rod guide tubes 26 and the support column 28 are each made from No. 304 stainless steel.

Figure 2:
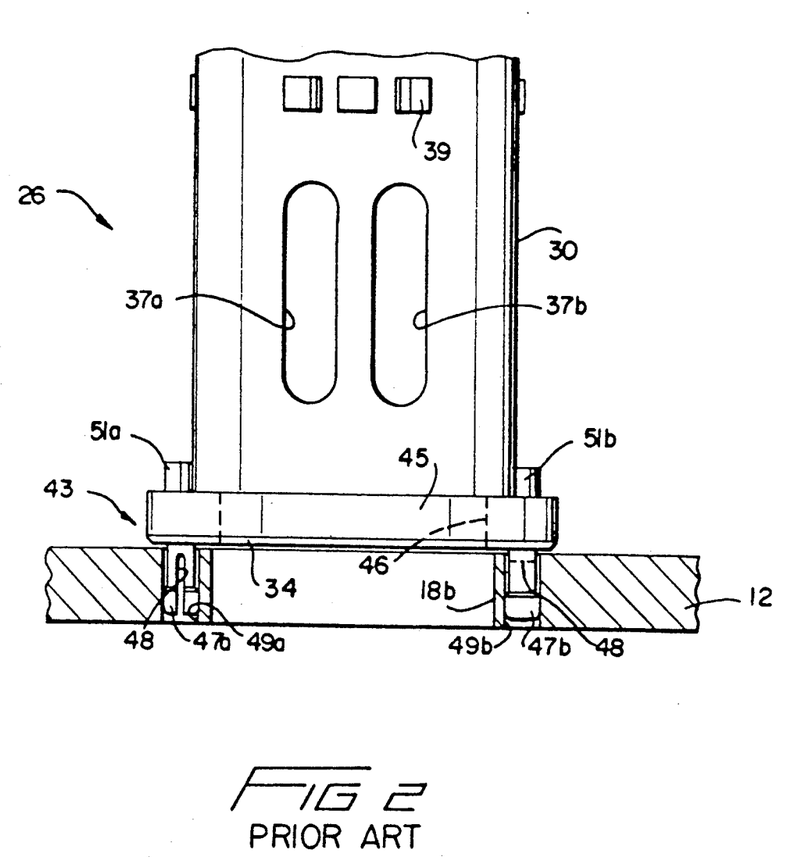
FIG. 2 is a partial cross-sectional side view of the bottom end of a prior art guide tube.
Figure 3A:
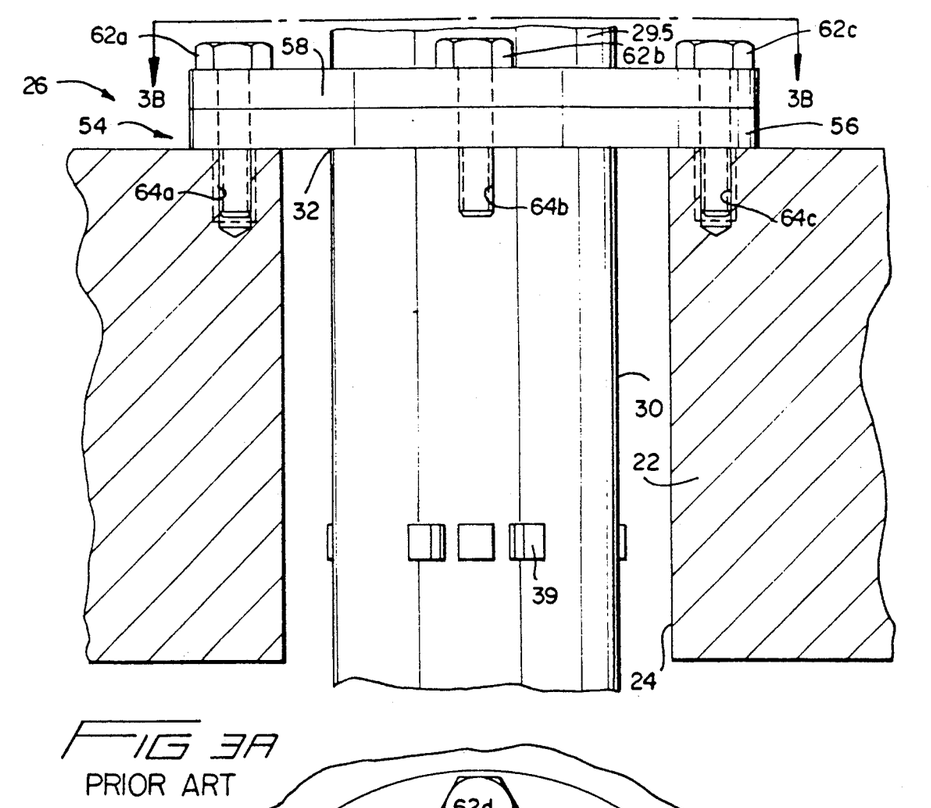
FIG. 3A is a partial cross-sectional side view of the top end of a prior art guide tube.
Figure 3B:
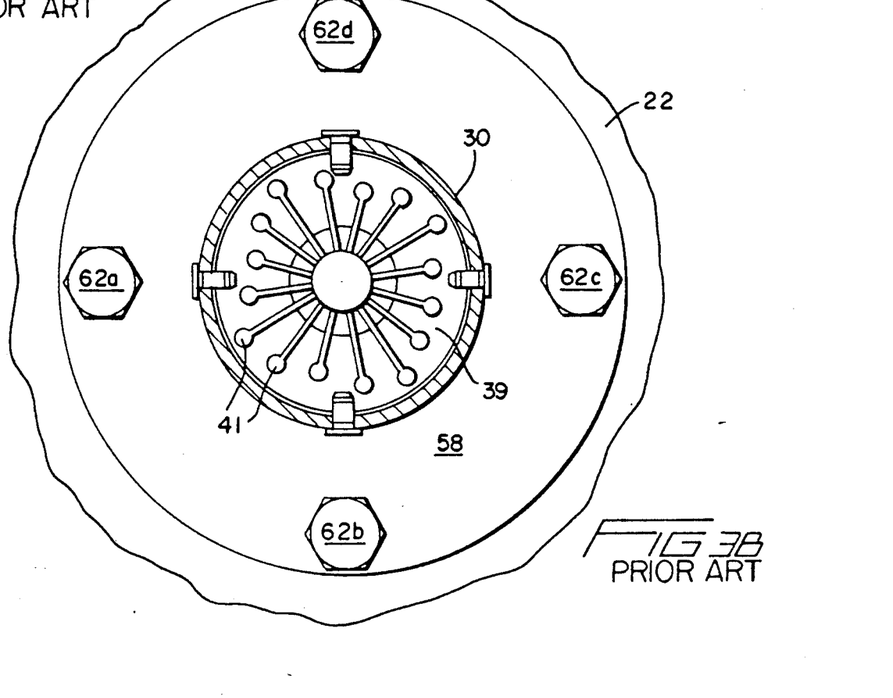
FIG. 3B is a cross-sectional view of the guide tube illustrated in FIG. 3A along the lines 3B—3B.

With reference now to FIGS. 2, 3A and 3B, a prior art control rod guide tube 26 is generally formed from a tubular member 30 having a top end 32, and a bottom end 34. The walls of the tubular member 30 are approximately 25 inches thick. With specific reference now to FIG. 2, the bottom end of the tubular member 30 includes a pair of flow ports 37a and 37b for directing the pressurized water that flows up through the interior of the tubular member 30 by way of upper core plate aperture 18b. Disposed just above these flow ports 37a, 37b are a series of guide plates 39 which are uniformly spaced along the longitudinal axis of the guide tube 26. Each of the guide plates 39 includes a plurality of rodlet openings 41 (shown in FIG. 3B) or receiving and guiding the individual neutron-absorbing rodlets of a control rod assembly 27. The open end of the tubular member 30 is maintained in alignment with the square flow aperture 18b of the upper core plate 12 by means of a lower mounting assembly 43. This assembly 43 includes circular flange 45 which extends out around the bottom end of the tubular member 30. The inner perimeter of the circular flange 45 defines a water conducting opening 46 for receiving the stream of pressurized water traveling through the flow aperture 18b of the upper core plate 12. The outer edge of the flange 45 includes a pair of opposing guide pin members 47a and 47b. These pin members 47a, 47b each include a centrally disposed slot 48 which affords some resiliency to the tapered ends of these pins. The pin members 47a and 47b are each resiliently engaged within a pair of bores 49a and 49b which are positioned on opposite sides of the flow aperture 18b. The pin members 47a and 47b provide lateral support for the guide tube 26 which keep it from moving or vibrating from side to side as pressurized water enters its open bottom end and flows out of the flow ports 37a and 37b. These pin members 47a and 47b are secured onto the flange 45 by means of lock nut assemblies 51a and 51b. In the prior art, both the pin members 47a and 47b and the lock nut assembly 51a and 51b are formed from Inconel 750.

With specific reference to FIGS. 3A and 3B, the top open end of the tubular member 30 of the guide tube 26 is secured around the top edge of one of the flow apertures 24 the upper support plate 22 by means of an upper mounting assembly 54. Like the previously discussed lower mounting assembly 43, the upper mounting assembly 54 includes a flange 56 which circumscribes the upper edge of the tubular member 30 of the guide tube 26. This flange 56 is in turn connected to both the bottom flange 58 of an upper guide tube 29.5 by means of bolts 62a–62d which screw into threaded bores 64a–64d that extend through flange 58, flange 56, and on into the upper support plate 22. The prior art upper mounting assembly 54 in effect suspends the guide tube 26 into position over the upper core plate 12. No significant tensile load is placed upon the tubular member 30 of such prior art guide tubes 26; all of the tensile load necessary to support the the upper core plate 12 over the fuel rod assemblies 14 is borne by the previously discussed support columns 28.

Figure 4A:
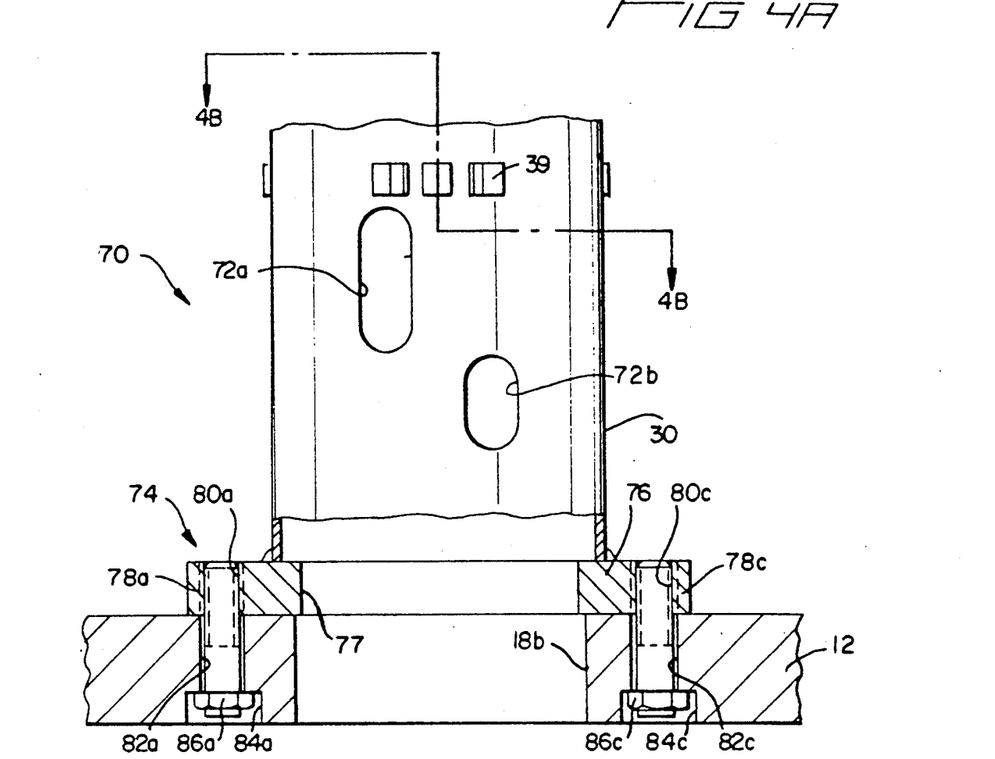
FIG. 4A is a partial cross-sectional side view of the bottom end of a combination guide tube and support column in conformance with the invention, illustrating how the lower mounting assembly secures this tube to the upper core plate of the reactor.
Figure 4B:
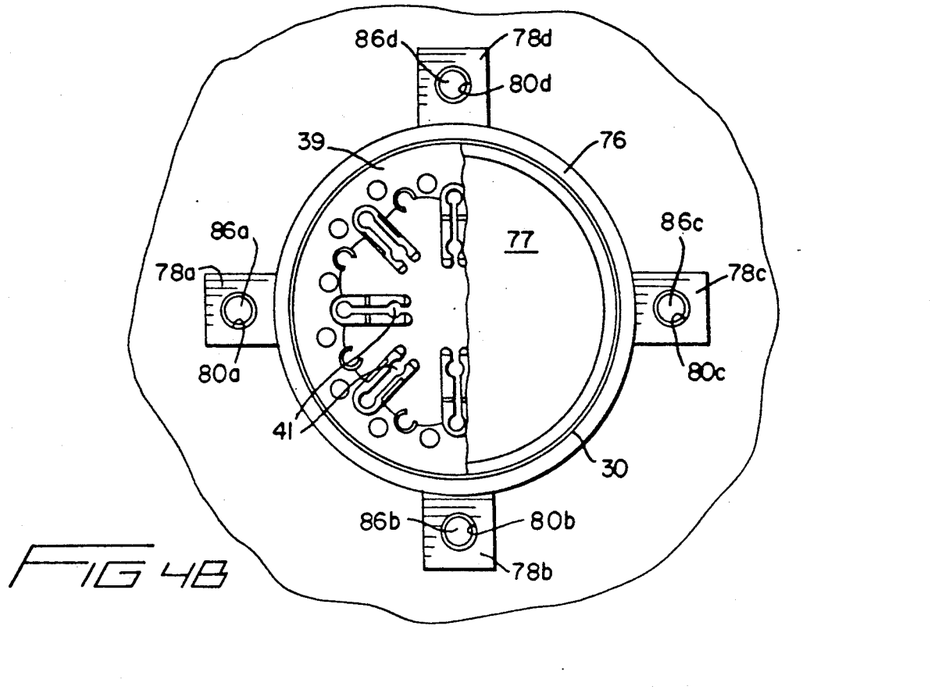
FIG. 4B is a cross-sectional view of the combined guide tube and support column illustrated in FIG. 4A along the line 4B—4B.

With reference now to FIGS. 4A and 4B, the combination guide tube and support column 70 of the invention includes a tubular member 30 and a series of uniformly spaced, substantially circular guide plates 39. The flow ports 72a and 72b (unlike the prior art flow ports 37a and 37b) preferably have differing areas to compensate for asymmetries in the flow resistance asserted exerted by the fuel rod assembly which the tube 70 contains. Additionally, the combined flow area of the ports 72a and 72b is deliberately made to be about twice the cross-sectional area of the flow conducting opening 77 of the flange 76 which circumscribes the bottom end of the tubular member 30. Such dimensioning helps insure that the ports 72a and 72b will not jet their respective water flows out so quickly so as to create lateral currents in the upper core barrel which could cause vibration and fretting of the control rod assemblies 27 contained within the guide tube and support columns 70. In order to avoid nonuniformities in the shear strength of the tubular member 30, these flow ports 72a and 72b are offset with respect to the longitudinal axis of the guide tube and support column 70.

The bottom end of the combination guide tube and support column 70 includes a lower mounting assembly 74 formed from the previously mentioned flange 76 which circumscribes the bottom edge of the tubular member 30, as well as four lugs 78a–78d which are equidistally spaced 90° degrees around the flange 76. The lugs 78a–78d include threaded bores 80 which are mutually alignable with a set of four, orthogonally disposed threaded bores 82a–82d located around the edge of the flow aperture 18b in the upper core plate 12. At its bottom end, each of the bores 82a–82d in the plate 12 terminates in a countersunk portion 84a–84d respectively. The lower mounting assembly 74 is held together by means of bolts 86a–86d having shanks which are threaded through the bores 80a–80d and 82a–82d, and bolt heads which are received within the countersunk portions 84a–84d as shown. Unlike the pin members 47a and 47b used in the mounting assembly 43 of a conventional guide tube, the bolts 86a-86d are formed from strain hardened No. 316 stainless steel which is quite similar to the No. 304 stainless steel forming the upper core plate 12 and the tubular 30 of the combination guide tube and support column 70 so as to avoid thermal stresses and failure due to stress corrosion cracking.

Figure 5A:
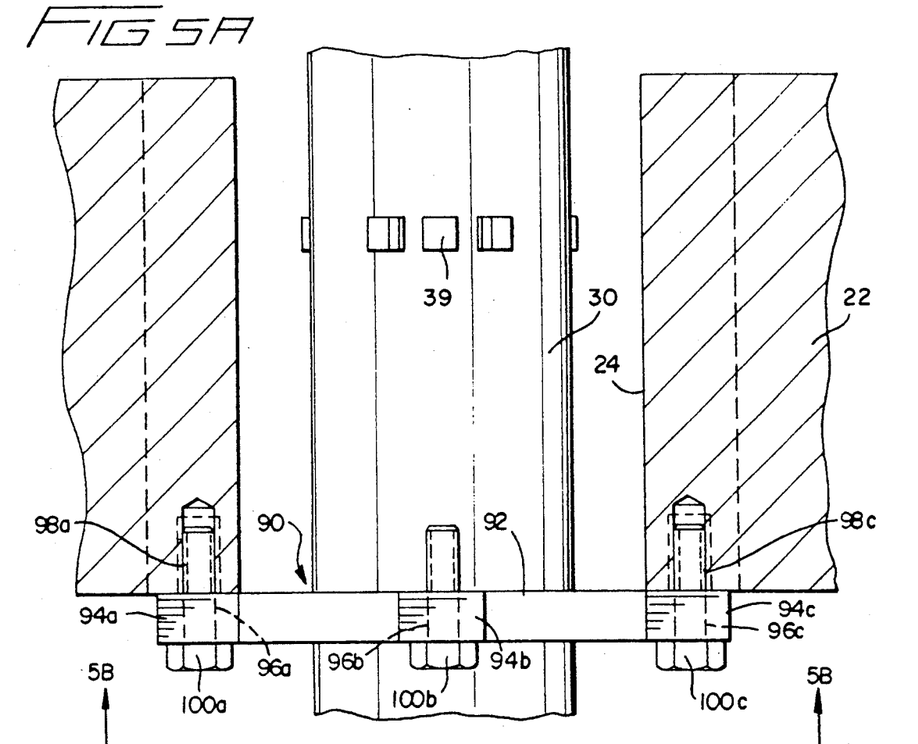
FIG. 5A is a partial cross-sectional side view of the upper end of the combined guide tube and support column of the invention.
Figure 5B:
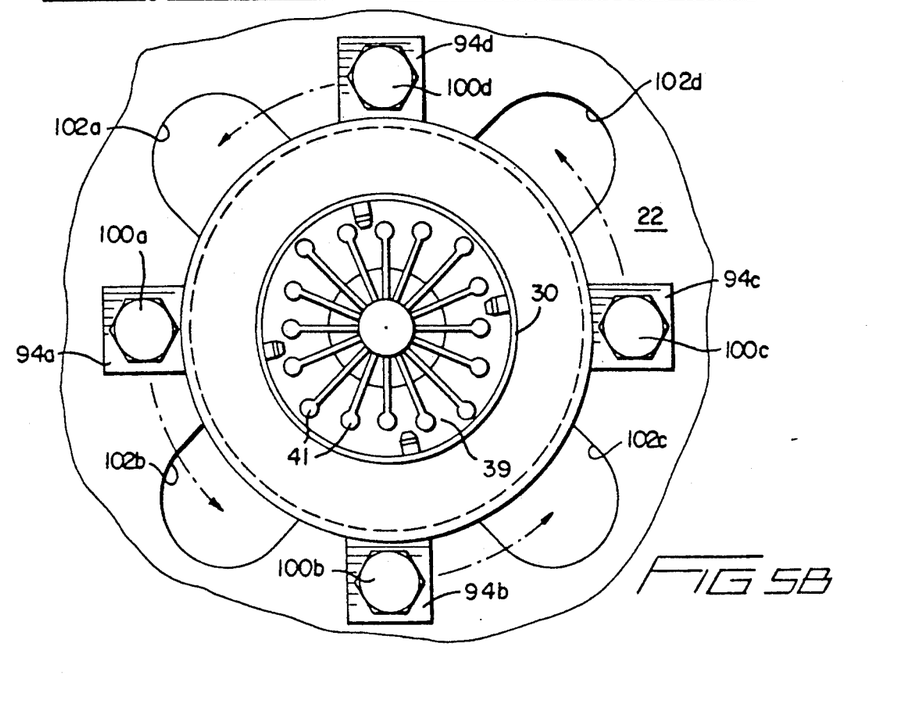
FIG. 5B is a cross-sectional view of the tube illustrated in FIG. 5A along the line 5B—5B.

With reference now to FIGS. 5A and 5B, the combination guide tube and support column 70 of the invention further includes an upper mounting assembly 90. This assembly 90 is formed from a flange 92 which circumscribes the outer wall of the tubular member 30 at an axial location just below the bottom surface of the upper support plate 22. The flange 92 is firmly secured to the wall of the tubular member 30 by peripheral welds (not shown). The flange 92 includes four lugs 94a-94d spaced 90° degrees around its periphery. Each of the lugs 94a-94d includes a threaded bore 96a-96d which is registerable with a threaded bore 98a-98d located on the underside of the plate 22 along the bottom end of the flow aperture 24. Again, strain hardened No. 316 stainless steel bolts 100a-100d extend through the threaded bores 96a-96d and 98a-98d in order to secure the mounting assembly 90 together.

As is best seen with respect to FIG. 5B, four cloverleaf cutouts 102a-102d are provided around the periphery of the flow aperture 24 in the positions shown. Each of these cloverleaf cutouts 102a-102d is larger than each of the mounting lugs 94a-94d. Such dimensioning allows the entire combination guide tube and support column 70 to be extracted out over the upper support plate 22 when the bolts 86a-86d and 100a-100d of the lower and upper mounting assemblies 74 and 90 are removed and the tubular member 30 is twisted at a 45 degree angle (as is indicated by the broken arrows), and the entire member 30 lifted upwardly.

Figure 6A:
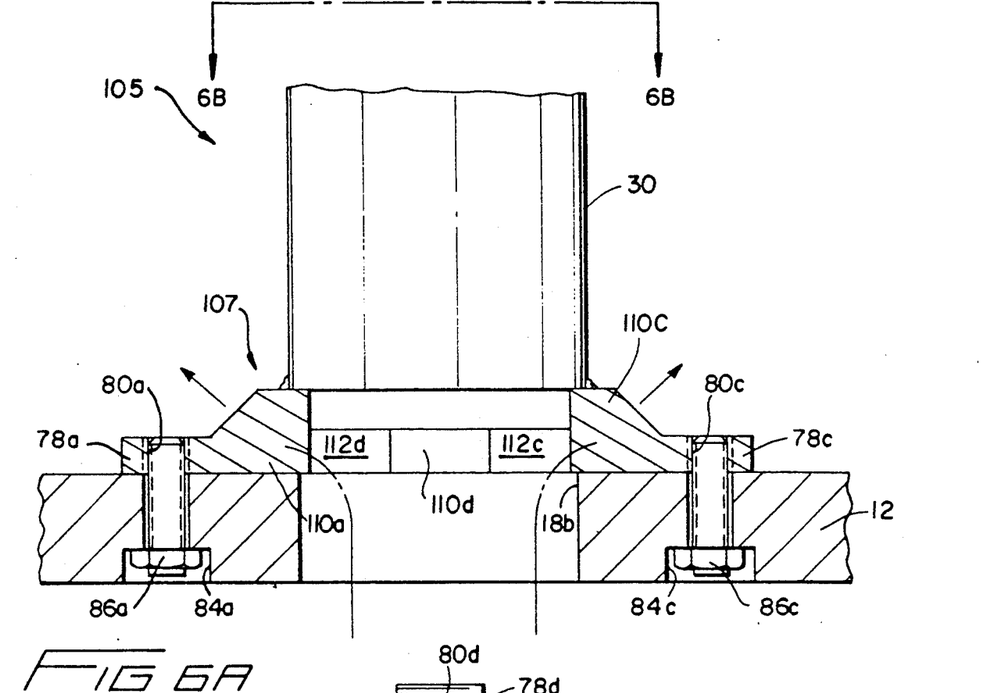
FIG. 6A is a partial cross-sectional side view of the lower end of an alternate embodiment of the combined guide tube and support column of the invention which utilizes offset lugs in lieu of flow ports to relieve water pressure.
Figure 6B:
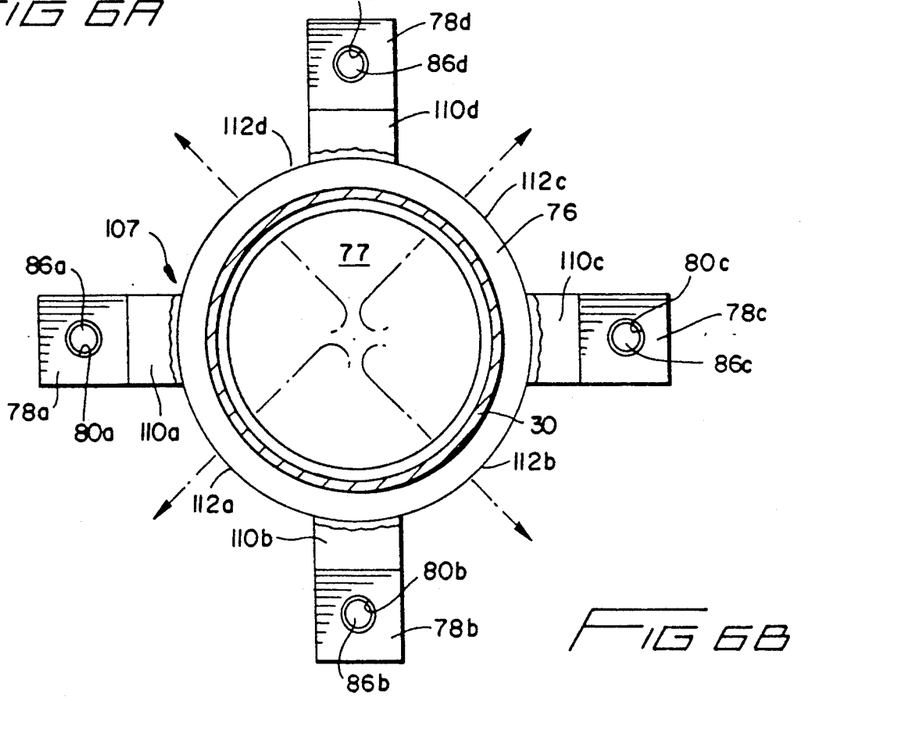
FIG. 6B is a cross-sectional view of the tube illustrated in FIG. 6A along the line 6B—6B.

FIGS. 6A and 6B illustrate an alternative embodiment 105 of the combination guide tube and support column of the invention. The upper mounting assembly of this alternate embodiment 105 is identical to the upper mounting assembly 90 previously discussed with respect to the combination guide tube and support column 70. Additionally, the lower mounting assembly 107 includes many of the same components as the previously discussed lower mounting assembly 74 of that embodiment 70. However, this alternate embodiment 105 differs from the embodiment 70 in that in lieu of flow ports 72a and 72b, the lugs 78a-78d are offset with offset portions 100a-100d so as to provide flow slots 112a-112d. As was the case with the flow ports 70a and 70b the combined area of the flow slots 112a-112d is approximately twice as much as the flow area of the open end of the tubular member 30. The individual flow areas of these slots 112a-112d may be made different from one another so as to balance the pressure of each stream of water ejected therefrom.

The use of either of the embodiments 70, 105 of the combined guide tube and support column of the invention greatly simplifies the structure of the upper internals of the reactor core 1 by almost entirely obviating the need for support columns 28. Such structural simplification comes without jeopardizing the relatively easy servicing features of the prior art, as either embodiment of the combination guide tube and support column 70, 105 may be removed by simply unscrewing the bolts of the lower and upper mounting assemblies 74, 90, 107 and merely turning the entire tube 70, 105 45° degrees and extracting it from the upper core barrel 7. Further, the use of 304 stainless steel in both the tubular members 30 forming the combined guide tube and support column 70, 105 in combination with the use of a similar stainless steel in the mounting bolts 86a-86d and 100a-100d minimizes stresses generated as a result of differential thermal expansion, and thus reduces if not eliminates the probability of stress corrosion cracking breaking either of the mounting assemblies. Finally, it should be noted that the word "tubular," as used in the specification and claims of this application, is not to be strictly construed as referring only to cylindrical tubes having circular cross sections, but is intended to cover any type of elongated conduit having any type of cross-sectional shape.

We claim:

1. An improved internals assembly for a nuclear reactor, said assembly including an upper support plate and an upper core plate, each of which includes apertures for conducting control rod assemblies into and out of fuel assemblies, each of the apertures of the upper support plate being aligned with one of the apertures of the upper core plate, wherein the improvement comprises at least one elongated and tubular support and guide tube member whose ends are connected between mutually aligned apertures in said support and core plates for both suspending said core plate from said support plate and for receiving and guiding a control rod assembly through said pair of mutually aligned apertures, and wherein the upper end of the tubular support and guide tube member includes an upper mounting means for detachably mounting said upper end around a selected aperture in the upper support plate, and wherein the improvement further comprises the provision of recesses along the perimeter of said selected aperture that are complementary in shape to the upper mounting means so that when the upper mounting means is detached from said upper support plate and oriented into alignment with said recesses, said support and guide tube member may be withdrawn through said selected aperture.

2. An improved internals assembly as defined in claim 1, wherein said tubular support and guide member includes a plurality of ports for discharging pressurized water flowing out of the apertures of the upper core plate.

3. An improved internals assembly as defined in claim 2, wherein the perimeter of the tubular support and guide member for uniformly discharging said pressurized water.

4. An improved internals assembly as defined in claim 1, wherein said upper mounting means includes at least two mounting lugs, each of which includes a bore for receiving a mounting bolt.

5. An improved internals assembly as defined in claim 1, wherein said upper support plate, upper core plate and tubular support and guide member are all formed from the same type of metal.

6. An improved internals assembly as defined in claim 1, wherein said upper support plate, upper core plate and tubular support and guide member are each formed from No. 304 stainless steel.

7. An improved internals assembly as defined in claim 1, wherein the upper and lower ends of the tubular support and guide tube member include upper and lower mounting means, respectively, for detachably connecting said ends of said support and guide tube member to said support and core plates, wherein each of said upper and lower mounting means includes at least two mounting lugs.

8. An improved internals assembly as defined in claim 7, wherein the mounting lugs of each of the mounting means include threaded bores for receiving mounting bolts.

9. An improved internals assembly as defined in claim 3, wherein the total area of said ports is approximately twice the cross-sectional area of the tubular support and guide member.

10. In a nuclear reactor having an upper core plate and an upper support plate, a support and guide tube member for both supporting said upper core plate from said support plate and for receiving and guiding a control rod assembly through mutually aligned apertures in said support and core plates, said support and guide tube member comprising a single walled elongated tubular body having an upper and lower mounting means for mounting an upper and a lower end of said tubular body around selected, aligned apertures in said support plate and said upper core plate, respectively, wherein said tubular body includes a plurality of ports for discharging pressurized water flowing out of the upper core plate, the combined flow area of said ports being about twice as great as the flow area defined by the cross-sectional area of the interior of said tubular body, and wherein said support plate, core plate and tubular body are all formed from the same metal to minimize any stresses occurring therebetween as a result of thermal differential expansion.

11. In a nuclear reactor having a metallic upper core plate and a metallic upper support plate, a support and guide tube member comprising:

an elongated tubular body for receiving and guiding a control rod assembly, said tubular body having an upper and a lower mounting means for detachably mounting an upper and a lower end of said body around selected aligned apertures in said support plate and upper core plate, respectively, wherein said tubular body includes a single wall only for both suspending said upper core plate from said support plate and for receiving and guiding a control rod assembly through mutually aligned apertures in said support and core plates, said single wall having a plurality of ports for discharging pressurized water flowing out of the upper core plate toward the support plate.

12. The support and guide tube member defined in claim 11, wherein said tubular body is made out of a metal having substantially the same thermal expansion characteristics as the metal forming the support plate and core plate to minimize any stresses occurring therebetween as a result of thermal differential expansion.

13. The support and guide tube member as defined in claim 11, further comprising a plurality of guide plates mounted in said single wall of said tubular body, wherein said plates include openings for slidably receiving and guiding rodlets of said control rod assembly.

14. In a nuclear reactor having a metal upper core plate and a metal upper support plate spaced from the core plate thereabove, a support and guide tube member comprising:

(a) an elongate, tubular body including mounting means for detachably fastening the tubular body respectively to said upper core plate and to said upper support plate in axial alignment with apertures formed therein, said tubular body having a single wall only both for supporting the upper core plate from the upper support plate and for receiving a movable control rod assembly through said apertures; and (b) a plurality of substantially circular guide plates disposed in said single-walled tubular body for guiding the control rod assembly, said substantially circular guide plates being supported in the single-walled tubular body in axially spaced relationship with respect to one another and (c) a plurality of openings for discharging, from the interior of the support and guide tube member, pressurized coolant flowing therein from the aligned apertures in the upper core plate.

* * * * *